Jan. 10, 1967 R. P. HOWELL ETAL 3,297,075
SNAP-LOCKING FIXTURES FOR INTERIOR DECORATING
Filed Jan. 28, 1964 3 Sheets-Sheet 1

Raymond P. Howell
George F. Swenck
Norbert A. Hamm
INVENTORS

BY *Glenn, Palmer &
Matthews*

Raymond P. Howell
George F. Swenck
Norbert A. Hamm
INVENTORS

Raymond P. Howell
George F. Swenck
Norbert A. Hamm
INVENTORS

United States Patent Office 3,297,075
Patented Jan. 10, 1967

3,297,075
SNAP-LOCKING FIXTURES FOR
INTERIOR DECORATING
Raymond P. Howell, Richmond, and George F. Swenck and Norbert A. Hamm, Henrico County, Va., assignors to Reynolds Metals Company, Richmond, Va., a corporation of Delaware
Filed Jan. 28, 1964, Ser. No. 340,697
7 Claims. (Cl. 160—19)

This invention relates to various snap-locking fixtures generally for interior decorating, and more particularly relates to snap-locking fixtures associated with closure members, such as sliding doors and windows, although the invention may be utilized with various wall structures. More specifically, the invention appertains to drapery mounting channels and light coves having snap-locking elements for attachment in combination or separately to supporting structures.

The drapery channel and light cove fixtures appertaining to the invention are adapted for rapid attachment to various structural support members where it is convenient or desirable to provide traversable draperies or indirect or diffusive light sources, as well as to provide combinations of such draperies and light sources. The rapid attachment of such fixture is afforded by complementary snap-locking elements of the drapery channels, light coves and the various support members.

In the preferred construction, the drapery channels and light coves are formed by extrusion of aluminum. Likewise, the structural support members containing complementary elements for snap-locking attachment of the channels and coves thereto are constructed preferably by extrusion of aluminum. Of course, other readily extrudable metals and material may be used, as well as other known methods of construction.

It is therefore a principal object of the invention to provide various snap-locking fixtures for interior decorating that are adapted for rapid attachment to various structural support members having complementary elements to facilitate snap-locking thereto;

Another object of the invention is to provide various extruded snap-locking fixtures for interior decorating that are adapted for rapid attachment to various extruded structural support members having complementary elements to facilitate snap-locking thereto;

A further object of the invention is to provide extruded drapery channels and light coves having snap-locking elements that are collectively or alternatively attachable to complementary elements of various structural support members to facilitate installation of either or both traversable draperies and indirect or diffusive light sources;

A still further object of the invention is to provide a combination assembly of an extruded drapery channel or light cove, either or both, in snap-locking attachment to an extruded closure member header;

Still another object of the invention is to provide an extruded drapery channel affording various interior decorative trim attachable in combination with an extruded structural support member by snap-locking complementary elements provided therefor;

Another object of the invention is to provide as an assembly to a closure member, in combination with an extruded header thereof, an extruded drapery channel in snap-locking attachment thereto and an extruded light cove in snap-locking attachment to such drapery channel;

Still another object of the invention is to provide, in combination with an extruded bracket mounted to a wall structure, a light cove having snap-locking elements for rapid attachment of the light cove to complementary element of the extruded bracket.

Other objects, features and advantages of the invention will become readily apparent from the detailed description and appended claims taken in conjunction with the drawings wherein;

Figure 1:
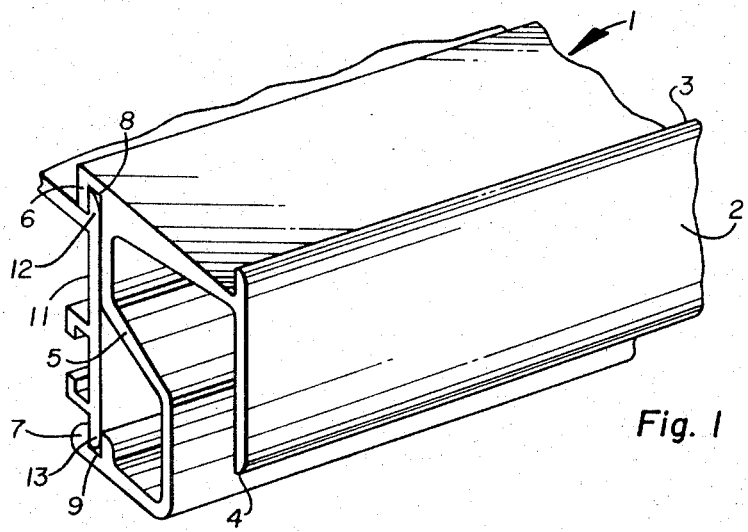
FIGURE 1 is a fragmentary perspective view of the drapery channel appertaining to the invention.

Referring now to FIGURE 1, the drapery channel extrusion, generally designated by the numeral 1, is substantially of an inverted U-shape in cross section having a front panel facing 2. The upper and lower edges of facing 2 define engaging elements 3 and 4, respectively, for a purpose yet to be described. Channel extrusion 1 has a rear leg 5 partially offset inwardly toward facing 2. Leg 5 has transversely extending flanges 6 and 7, each flange defining mutually opposing grooves or slots 8 and 9, respectively. Slots 8 and 9, as illustrated, retain channel extrusion 1 in snap-locked relationship to structural support member 11 along ridge elements 12 and 13 which affords complementary elements to achieve the snap-locking attachment into grooves 8 and 9. Of course, any traversal track configuration desired may be formed within the drapery channel as extruded.

Figure 2:
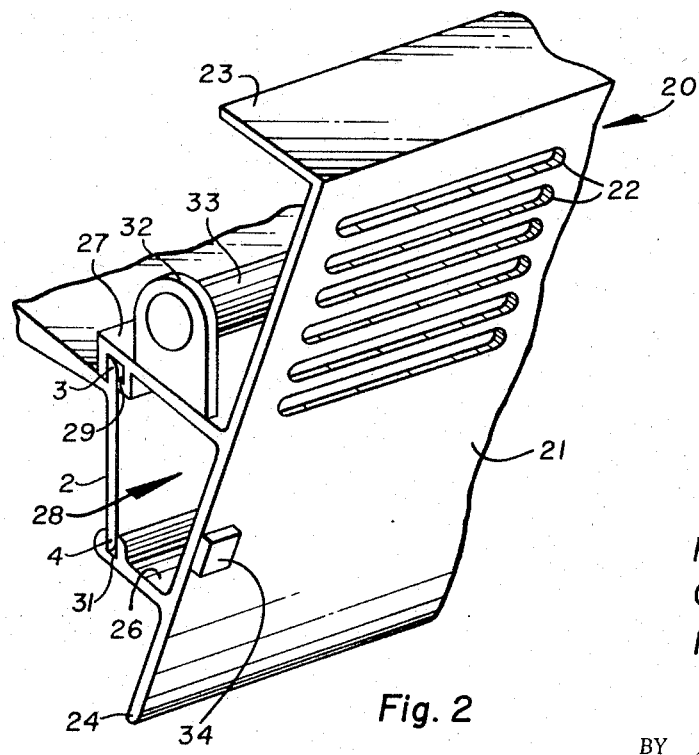
FIGURE 2 is a fragmentary perspective view of the light cove in snap-locking attachment to the drapery channel of FIGURE 1.

As illustrated in FIGURE 2, the light cove extrusion, generally designated by numeral 20, is an acute angle extrusion defined by a facing surface 21 having a series of horizontal slots 22 therein, surface 21 terminating at one end with a rearwardly projecting top surface 23 and at the other end in a rearwardly rolled lip 24. Intermediate lip 24 and slots 22 projecting rearwardly is a pair of extension ledges 26 and 27 parallel to top surface 23 and defining wiring conduit 28, generally shaped like a right angle trapezoid. Extension ledges 26 and 27 each terminate perpendicularly to a mutual plane and form mutually facing channel grooves 29 and 31. As illustrated, front panel facing 2 of drapery channel extrusion 1 is attached to light cove extrusion 20 in snap-locking relationship by engaging elements 3 and 4 residing in channel grooves 29 and 31, respectively. Mounted on the upper surface of ledge 27 is light source fixture 32 for mounting light source 33. A switch 34 is conveniently mounted on the lower edge of facing surface 21. For simplicity, the wiring for light source fixture 32 and switch 34 is not illustrated.

Figure 3A:
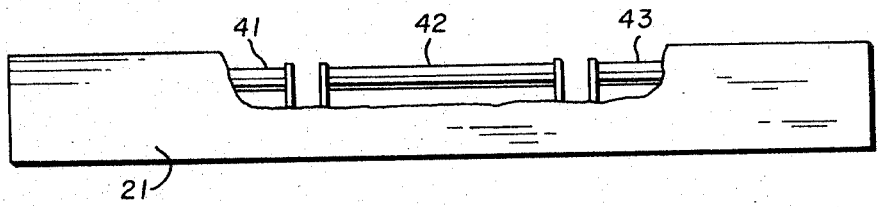
FIGURE 3A is a front view of a light cover with the front panel partially broken away to expose part of the installed light sources.
Figure 3B:
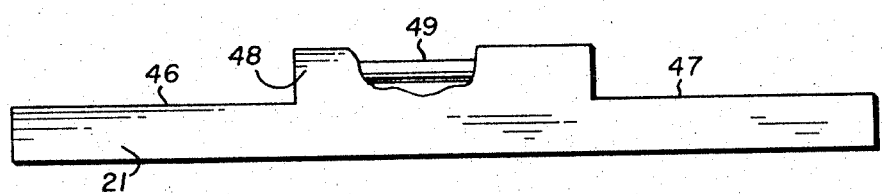
FIGURE 3B is a front view of the light cove with one light source adapted for snap-locking attachment to a drapery channel longer than the light source.
Figure 3C:
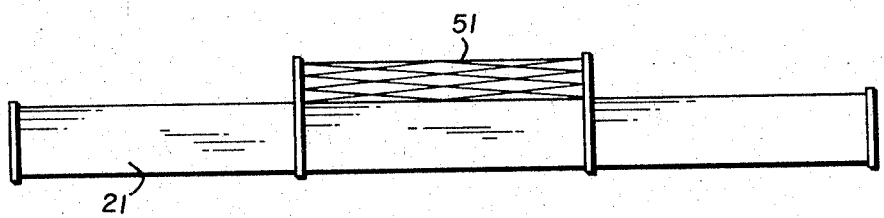
FIGURE 3C is a front view of a light cove short extrusion in which the front panel center-section is cut and extended.

Now with reference to FIGURES 3A, 3B and 3C, various modifications of facing surface 21 of light cove extrusion 20 will be described. In FIGURE 3A, the facing surface 21 extends over three light source fixtures 41, 42 and 43, surface 21 being partially broken away for illustrative purposes. The light cove extrusion, as depicted in FIGURE 3B, is partially cut away at 46 and 47 with center-section 48 remaining to provide diffusiveness to a single light source 49 shown in the partially broken-away portion of section 48. FIGURE 3C depicts a short extrusion of light cove 20 with facing surface 21 center section cut and extended to form diffuser 51 for a single light source not shown. In all the FIGURES 3A, 3B and 3C, the ends are trimmed in wood or aluminum as desired.

Figure 4:
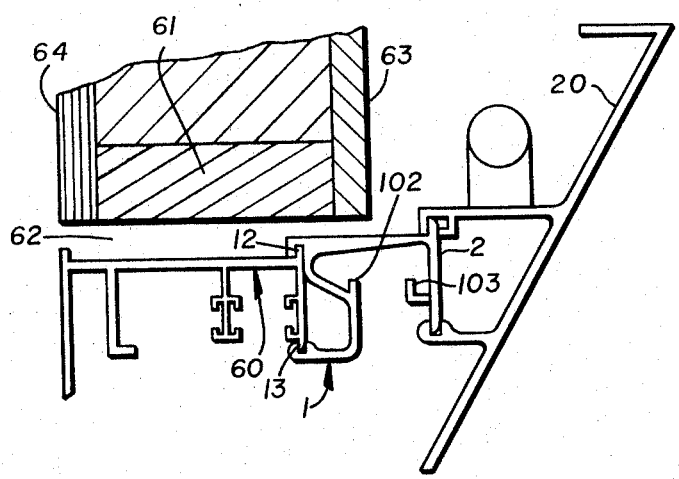
FIGURE 4 is a sectional view of a combination appertaining to the invention including extruded closure header, drapery channel and light cove in snap-locking attachment, the drapery channel including two drapery traverse tracks and the light cove including a light source.

Next considering FIGURE 4, drapery channel extrusion 1 and light cove extrusion 20 are shown in snap-locking attachment to each other and door or window head extrusion, generally designated 60. Door or window header extrusion 60 is mounted by any conventional hanger to header 61 with a small deflection space 62 therebetween. On one side of header 61 is wall structure 63 extending to the upper surface of drapery extrusion 1. At the other side side of header 61 is sheathing 64, providing outside door or window finishing.

Figure 5:
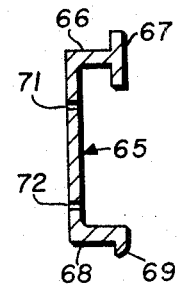
FIGURE 5 illustrates a wall mount appertaining to the invention.

FIGURE 5 illustrates wall bracket or mount extrusion 65 which is generally a shallow U-shape. Right angle leg 66 terminates in a T-shaped engaging edge 67, whereas right angle leg 68 terminates in an L-shaped engaging edge 69. Bracket 65 further defines a pair of mounting holes 71 and 72. Bracket 65 may be any length and may be used alone or in multiples depending on the length selected. Wall bracket extrusion 65 provides complementary elements for snap-locking attachment of drapery extrusion 1 or light cove extrusion 20 to a wall structure as hereinafter described.

Figure 6A:
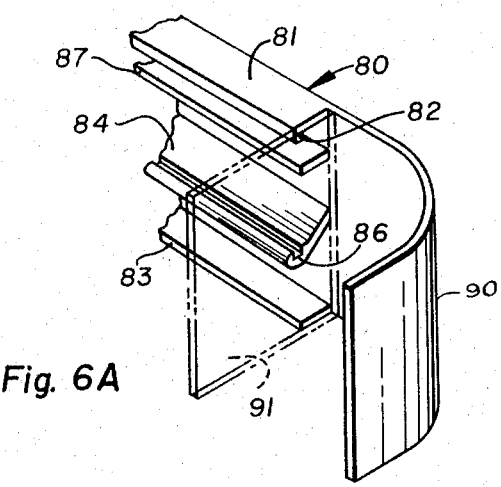
FIGURE 6A is a fragmentary perspective view of a decorative trim for use with the drapery channel having a rounded corner and alternatively illustrated in dashed lines with a square corner.
Figure 6B:
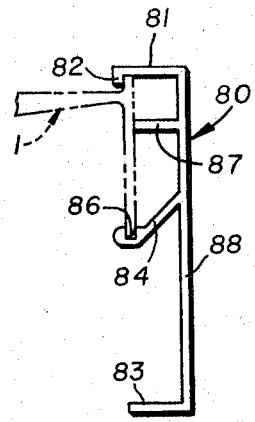
FIGURE 6B is a cross sectional view of the decorative trim depicted in FIGURE 6A.
Figure 7A:
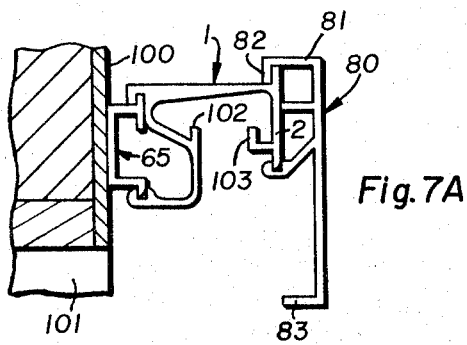
FIGURE 7A depicts the drapery channel with decorative trim utilizing the wall mount of FIGURE 5, the combination in snap-locking attachment adjacent to a window support member.

With reference to FIGURES 6A and 6B, a trim extrusion generally designated 80 is depicted. Trim 80 has the general shape of a U-channel defining legs 81 and 83. Upper leg 81 terminates in a downwardly facing open hook 82. Intermediate leg 81 and leg 83, angle ledge 84 is provided terminating in an upwardly facing groove hook 86. Open hook 82 and groove hook 86 define a plane parallel to front surface 88 of trim 80. Right angle ledge 87 is provided intermediate open hook 82 and groove hook 86. Ledge 87 provides stand-off support for trim extrusion 80 when snap-locked to drapery extrusion 1 as best illustrated in FIGURES 6B and 7A. By cutting off ledges 84 and 87, as well as legs 81 and 83 over a portion of trim extrusion 80, rounded corner 90 may be provided or alternatively square corner 91, illustrated in dashed lines (see FIGURE 6A). It will be readily understood that exterior or front surface 88 of trim extrusion 80 may be extruded in any of many decorative motifs. Trim extrusion may be attached in snap-locking relation to drapery extrusion 1 where the traversable draperies are designed such as not to overlap facing 2.

Trim extrusion 80 as used with drapery extrusion 1 is further described herein with reference to FIGURE 7A. As illustrated, wall bracket extension 65 is mounted to a wall structure 100 just above window casing 101. Drapery extrusion 1 is snap-locked to bracket 65 by complementary elements. Several brackets 65 may be necessary to provide the proper support for drapery extrusion 1, depending on the length of brackets 65 and the drapery extrusion 1. Inside the channel of drapery extrusion 1, a pair of drapery traversal tracks 102 and 103 is provided for mounting suitable drapery carriers (not shown). Trim extrusion 80 is snap-locked to front panel facing 2 by the complementary snap-locking elements.

Figure 7B:
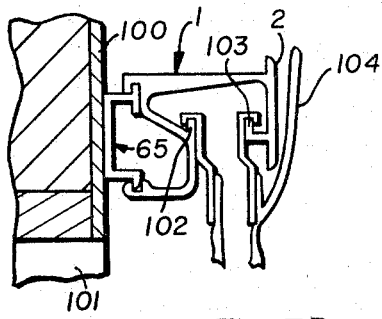
FIGURE 7B depicts the drapery channel of FIGURE 7A with an overlapping drapery attached therein with the decorative trim removed.

In FIGURE 7B, the trim extrusion 80 is removed from drapery channel extrusion 1 to permit overlap of traversable drapery 104. It will be understood that trim extrusion 80 may be removed as desired to change drapery styles and then if later desired reattached, all quite readily and easily.

Figure 8:
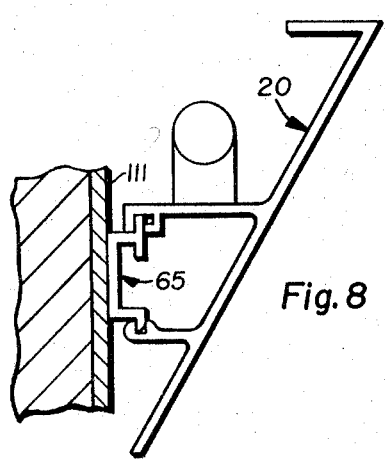
FIGURE 8 depicts the light cove incorporating the wall mount of FIGURE 5 for snap-locking attachment to a wall structural portion to afford an illumination system.

In FIGURE 8, light cove extrusion 20 is depicted mounted to wall bracket extrusion 65 (which is best illustrated in FIGURE 5). Bracket extrusion 65 is attached to any appropriate region or portion 111 of a wall structure, thus affording an independent illumination system.

The foregoing disclosure of the invention has been made with references to various alternate embodiments and combinations thereof. It will be readily apparent to those skilled in the art that various changes and modifications may be made; however, such changes and modifications are within the scope of the invention as defined in the claims appended hereto.

What is claimed is:

1. A snap-locking fixture for interior decorating comprising a generally inverted U-shaped channel member, one leg of said channel member being a facing panel defining a transverse juncture with the center section of said channel member and extending past said juncture forming an engaging ridge and the end of said panel opposite the engaging ridge forming an engaging element, the engaging ridge and the engaging element being suitable to function as complementary snap-locking members, the other leg of said channel member at the juncture to the channel center forming a transverse flange terminating with a downwardly facing slot, said other leg intermediate its length being inwardly offset toward said panel and then outwardly folded to define a ledge terminating with a groove centered under said slot, the openings of said slot and said groove mutually opposing to provide snap-locking attachment onto a support structure having complementary elements therefor and a hanger member provided within said inverted U-shaped channel member for suspension of various materials.

2. The fixture of claim 1, wherein said U-shaped channel member and hanger member are a unitary aluminum extrusion.

3. The fixture of claim 2, wherein said hanger member is a traversal track.

4. A combination snap-locking fixture for interior decorating of a closure member comprising an inverted U-shaped drapery extrusion, one leg of said drapery extrusion being a facing panel defining a transverse juncture with the center section of said drapery extrusion and extending past said juncture forming an engaging ridge and the end of said panel opposite said engaging ridge forming engaging element, the other leg of said drapery extrusion having a transverse flange at the juncture with the center section of said drapery extrusion, said flange defining a downwardly facing slot, said other leg extending downwardly then inwardly toward said panel and folding outwardly to define a ledge terminating with a groove centered under said slot, a closure header extrusion constructed to mount a closure member and defining a pair of complementary engaging ridges spaced apart and received within said downwardly facing slot and said groove of the drapery extrusion by snap-locking attachment, and a light cove extrusion having a panel face plate defining in its upper area light transmittible regions and laterally projecting at one side from the lower area of said panel face plate a pair of parallel ledges terminating perpendicularly to a mutual plane and defining mutually opposing recesses, said opposing recesses receiving said engaging ridge and said engaging element of the drapery extrusion by snap-locking attachment.

5. The combination fixture of claim 4, wherein said closure header extrusion is a door header extrusion.

6. The combination fixture of claim 4, wherein said closure header extrusion is a window header extrusion.

7. A combination interlocked drapery extrusion and light cove extrusion comprising an inverted U-shaped drapery extrusion, one leg of said drapery extrusion being a facing panel defining a transverse juncture with the center section of said drapery extrusion and extending past said juncture forming an engaging ridge and the end of said panel opposite said engaging ridge forming an engaging element, the other leg of said drapery extrusion having a transverse flange at the juncture with the center section of said drapery extrusion, said flange defining a downwardly facing slot, said other leg extending downwardly then inwardly toward said panel and folding outwardly to define a ledge terminating with a groove centered under said slot, said groove and said slot providing snap-locking attachment of said drapery channel to a support member, and a light cove extrusion having a panel face plate defining in its upper area light transmittible regions and laterally projecting at one side from the lower area of said panel face plate a pair of parallel ledges terminating perpendicularly to a mutual plane and defining mutually opposing recesses, said opposing recesses in snap-locked registry with said engaging ridge and said engaging element of the drapery extrusion.

References Cited by the Examiner

UNITED STATES PATENTS 2,526,806 10/1950 Charbonneau _____ 160—38
2,922,029 1/1960 Eschelbach et al. _____ 52—28 X

FOREIGN PATENTS 849,517 9/1960 Great Britain.

FRANK L. ABBOTT, *Primary Examiner.*

R. S. VERMUT, *Assistant Examiner.*